(12) United States Patent
Dai et al.

(10) Patent No.: US 8,589,705 B2
(45) Date of Patent: Nov. 19, 2013

(54) METHOD, STORAGE MEDIUM AND HOST COMPUTER FOR MANAGING PULSE-WIDTH MODULATION USING THE HOST COMPUTER

(75) Inventors: Dong-Yan Dai, Shenzhen (CN); Jian Peng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 493 days.

(21) Appl. No.: 12/947,706

(22) Filed: Nov. 16, 2010

(65) Prior Publication Data
US 2011/0283030 A1 Nov. 17, 2011

(30) Foreign Application Priority Data
May 14, 2010 (CN) .......................... 2010 1 0172512

(51) Int. Cl.
*G06F 1/00* (2006.01)
(52) U.S. Cl.
USPC .......................................... 713/300

(58) Field of Classification Search
USPC .......................................... 713/300
See application file for complete search history.

(56) References Cited

U.S. PATENT DOCUMENTS

| | | | | |
|---|---|---|---|---|
| 5,631,814 A | * | 5/1997 | Zak | 363/37 |
| 6,138,047 A | * | 10/2000 | Proffitt et al. | 700/14 |
| 7,019,622 B2 | * | 3/2006 | Orr et al. | 340/407.1 |
| 7,391,132 B2 | * | 6/2008 | Chen | 307/43 |
| 2003/0052544 A1 | * | 3/2003 | Yamamoto et al. | 307/66 |
| 2007/0007969 A1 | * | 1/2007 | Dai et al. | 324/601 |
| 2010/0308749 A1 | * | 12/2010 | Liu | 315/307 |

* cited by examiner

*Primary Examiner* — Mohammed Rehman
(74) *Attorney, Agent, or Firm* — Altis & Wispro Law Group, Inc.

(57) ABSTRACT

A host computer and a method for managing pulse-width modulation (PWM) include detecting a signal of a powerGD port. The management system further includes confirming a first state according to a first signal of the powerGD port. The management system further includes enabling the PWM port if the first state is in a power-on state, and disabling the PWM port if the first state is a power-off state.

12 Claims, 3 Drawing Sheets

METHOD, STORAGE MEDIUM AND HOST COMPUTER FOR MANAGING PULSE-WIDTH MODULATION USING THE HOST COMPUTER

BACKGROUND

1. Technical Field

Embodiments of the present disclosure relate to data management, and in particular, to a method, a storage medium and a host computer for managing pulse-width modulation (PWM) in the host computer.

2. Description of Related Art

When a computer is connected to an alternating current (AC) power supply and an operating system (OS) of the computer has not started up, pulse width modulation (PWM) leakage of current may occur, with a possible result the computer not powering up. A pull-up level 3.3V of the computer may be changed to standby 3.3V in order to prevent the PWM leakage. However, power consumption of the computer may be increased, and the PWM of the host computer cannot be managed efficiently and easily.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, for example, JAVA, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage system.

Figure 1:
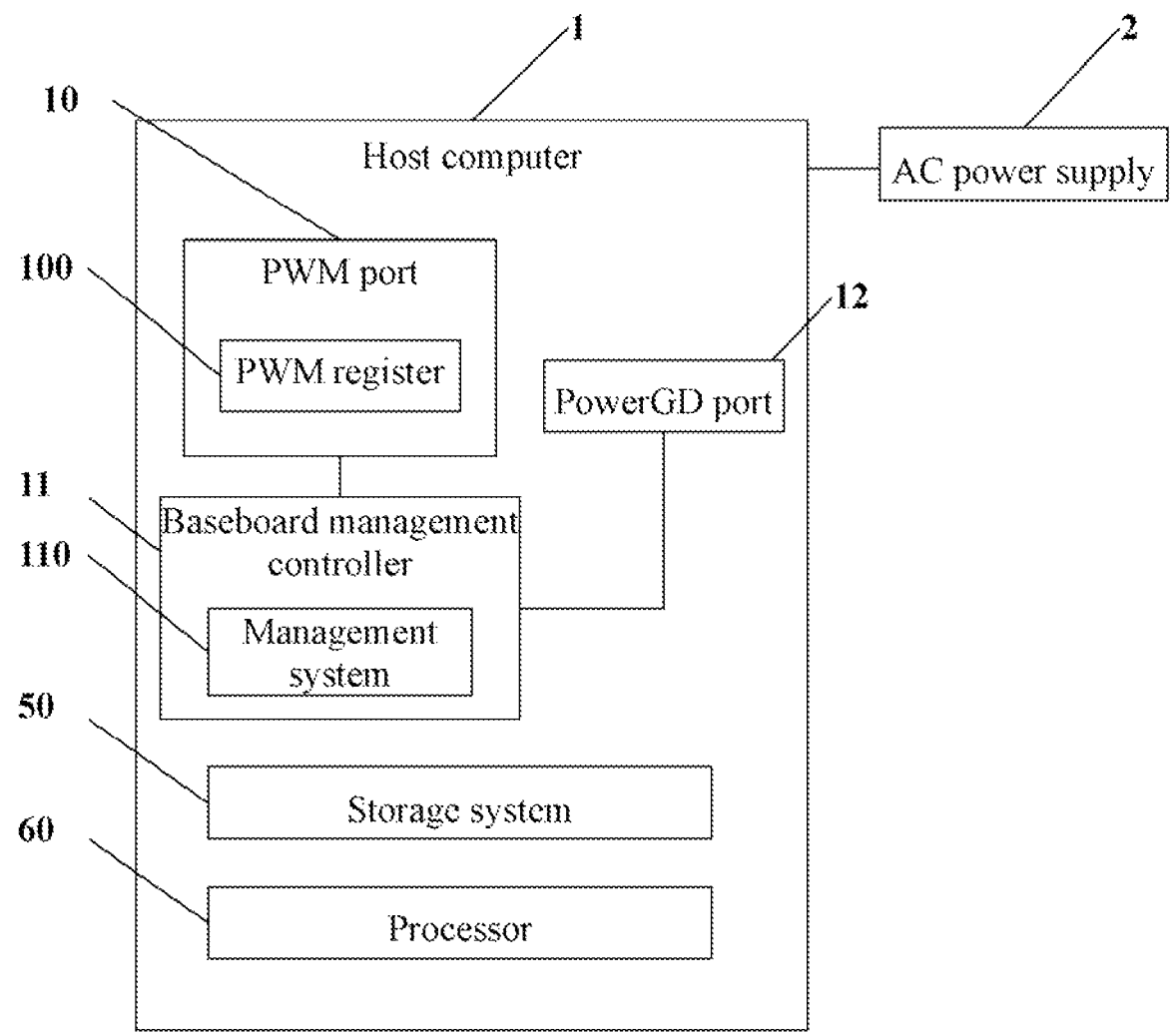
FIG. 1 is a block diagram of one embodiment of a host computer including a management system.

FIG. 1 is a block diagram of one embodiment of a host computer 1 including a management system 110. The host computer 1 may include a pulse-width modulation (PWM) port 10, a baseboard management controller (BMC) 11, and a powerGD port 12. The management system 110 may enable or disable the PWM port 12, and avoid PWM leakages. The host computer 1 may be a server, or a storage server, for example. The BMC 11 adopts a PWM method to control rotation of fans (not shown in FIG. 1) of the host computer 1. The host computer 1 is connected to an alternating current (AC) power supply 2.

The PWM port 10 and the powerGD port 12 are both connected to the BMC 11. The powerGD port 12 is a powerGD General Purpose Input/Output (GPIO) port of the host computer 1. A signal of the powerGD port 12 may be an input signal of power state of the host computer 1 transmitted from the host computer 1 to the management system 110. Power state of the host computer 1 may be determined by obtaining the signal of the powerGD 12. In some embodiments, if the signal of the powerGD 12 is high level, such as. 3.3V, the host computer 1 is in a power-on state. If the signal of the powerGD 12 is low level, such as, 0V, the host computer 1 is in a power-off state. In some embodiments, the signal of the power GD 12 may have the high level (3.3V) and low level (0V). The PWM port 10 may include a PWM register 100. The PWM port 10 can be enabled and disabled by writing specific commands to the PWM register 100.

The host computer 1 further includes a storage system 50 and a processor 60. The storage system 50 may be a memory system of the host computer 1. The processor 60 executes one or more computerized code of the host computer 1 and other applications, to provide the functions of the host computer 1.

Figure 2:
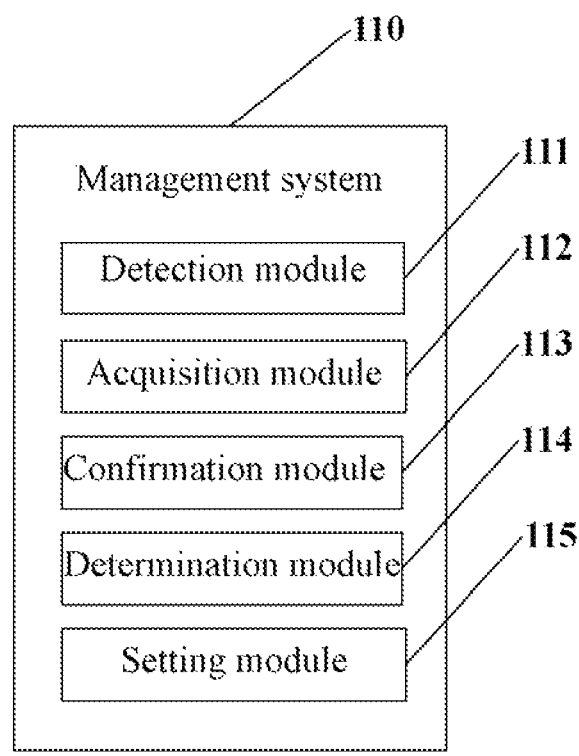
FIG. 2 is a block diagram of one embodiment of the management system of FIG. 1.

FIG. 2 is a block diagram of one embodiment of the management system 110 of FIG. 1. In some embodiments, the management system 110 includes a detection module 111, an acquisition module 112, a confirmation module 113, a determination module 114, and a setting module 115. The modules 111-115 may comprise computerized code in the form of one or more programs that are stored in the storage system 50. The computerized code includes instructions that are executed by the processor 60 to provide functions for modules 111-115. Details of these operations follow.

The detection module 111 detects the signal of the powerGD port 12. For example, the detection module 111 may establish a task of detecting the signal of the powerGD port 12.

The acquisition module 112 acquires the signal of the powerGD port 12 according to the detected signal of the powerGD port 12 periodically. For example, the acquisition module 114 acquires the signal of the powerGD port 12 at each 1 second.

The confirmation module 113 confirms a first state of the host computer 1 according to a first signal of the powerGD port 12. The state may be the power-on state or the power-off state. In some embodiments, if the signal of the powerGD port 12 is 3.3V (high), the confirmation module 113 confirms that the state of the host computer 1 is the power-off state. If the signal of the powerGD port 12 is 0V (low), the confirmation module 113 confirms that the state of the host computer 1 is the power-on state.

The determination module 114 determines whether the first state of the host computer 1 is the power-on state or the power-off state, according to the confirmed first state of the first signal of the powerGD port 12.

If the first state is the power-on state, the setting module 115 may enable the PWM port, and if the first state is the power-off state, the setting module 115 may disable the PWM port. The setting module 115 may enable and disable the PWM port 10 by writing commands to the PWM register 100. In some embodiments, the setting module 115 writes a command of "0x0FFF0001" into the PWM register to disable the PWM port 10, or writes a command of "0x0FFF0701" into the PWM register 100 to enable the PWM port 10.

The determination module 114 further determines whether the second state is the same as the first state of the host computer 1. In some embodiments, the second state may represent a current state of the host computer 1, and the first state may represent a previous state of the host computer 1.

If the second state is different from the first state, the confirmation module 113 further confirms a second state of the host computer 1, and the determination module 114 further determines whether a second state of the host computer 1 is the power-on state or the power-off state, according to the confirmed second state of the signal of the powerGD port 12. The setting module 115 may enable or disable the PWM port 10 according to the state of the second state.

Figure 3:
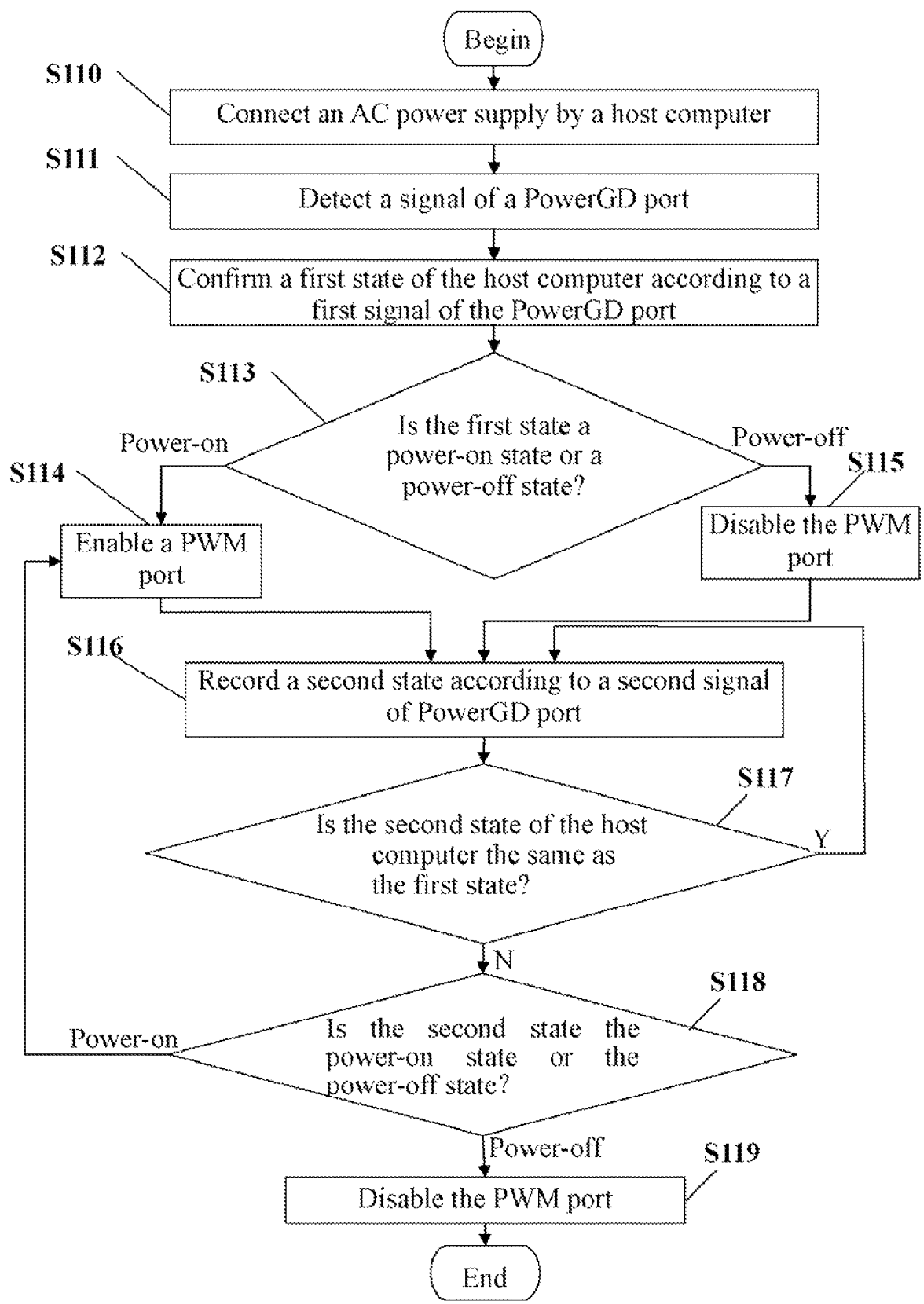
FIG. 3 is a flowchart of one embodiment of a method for managing PWM in a host computer, such as, for example, that of FIG. 1.

FIG. 3 is a flowchart of one embodiment of a method for managing PWM in a host computer 1. Depending on the embodiment, additional blocks may be added, others removed, and the ordering of the blocks may be changed.

In block S110, the host computer 1 connects to the AC power supply 2.

In block S111, the detection module 111 detects the signal of the powerGD port 12.

In block S112, the acquisition module 112 acquires the signal of the powerGD port 12 periodically according to the detected signal of the powerGD port 12, and the confirmation module 113 confirms a first state of the host computer 1 according to a first signal of the powerGD port 12.

In block S113, the determination module 114 determines whether the first state of the host computer 1 is the power-on state or the power-off state.

If the first state of the host computer 1 is the power-on state, in block S114, the setting module 115 writes the command of "0x0FFF0701" into the PWM register 100 to enable the PWM port 10, and block S116 is implemented.

If the first state of the host computer 1 is the power-off state, in block S114, the setting module 115 writes the command of "0x0FFF0001" into the PWM register to disable the PWM port 10. This block can avoid the PWM leakage.

In block S116, the confirmation module 113 confirms a second state of the host computer 1 according to a second signal of the powerGD port 12.

In block S117, the determination module 114 determines whether the second state is the same as the first state of the host computer 1. If the second state is the same as the first state of the host computer 1, and the procedure returns to block S116.

If the second state is different from the first state of the host computer 1, in block S118, the determination module 114 further determines whether the second state of the host computer 1 is the power-on state or the power-off state. If the second state of the host computer 1 is the power-on state, and the procedure returns to block S114.

If the second state of the host computer 1 is the power-off state, in block S119, the setting module 115 writes the command of "0x0FFF0001" into the PWM register to disable the PWM port 10.

It should be emphasized that the described inventive embodiments are merely possible examples of implementations, and set forth for a clear understanding of the principles of the present disclosure. Many variations and modifications may be made to the-described inventive embodiments without departing substantially from the spirit and principles of the present disclosure. All such modifications and variations are intended to be comprised herein within the scope of this disclosure and the-described inventive embodiments, and the present disclosure is protected by the following claims.

What is claimed is:

1. A computer-implemented method for managing pulse-width modulation (PWM) in a host computer, the host computer comprising a PWM port and a powerGD port, the method comprising:
   periodically acquiring signals of the powerGD port;
   confirming a first state of the host computer corresponding to a first signal of the powerGD port;
   enabling the PWM port upon the condition that the first state is a power-on state; or
   disabling the PWM port upon the condition that the first state is a power-off state;
   confirming a second state of the host computer according to a second signal of the powerGD port;
   determining whether the second state is same as the first state of the host computer;
   enabling the PWM port according to the second state with the power-on state or disabling the PWM port according to the second state with the power-off state, upon the condition that the second state is different from the first state.

2. The method as claimed in claim 1, wherein PWM port further comprises a PWM register.

3. The method as claimed in claim 2, wherein the method further comprising:
   writing a command of "0x0FFF0001" into the PWM register to disable the PWM port; and
   writing a command of "0x0FFF0701" into the PWM register to enable the PWM port.

4. The method as claimed in claim 1, wherein the method further comprising:
   connecting an alternative current (AC) power supply to provide power to the host computer.

5. A non-transitory storage medium storing a set of instructions, the set of instructions capable of executed by a processor to perform a method for managing pulse-width modulation (PWM) in a host computer, the host computer comprising a PWM port and a powerGD port, the method comprising:
   periodically acquiring signals of the powerGD port;
   confirming a first state of the host computer corresponding to a first signal of the powerGD port;
   enabling the PWM port upon the condition that the first state is a power-on state; or
   disabling the PWM port upon the condition that the first state is a power-off state;
   confirming a second state of the host computer according to a second signal of the powerGD port;
   determining whether the second state is the same as the first state of the host computer;
   enabling the PWM port according to the second state with the power-on state or disabling the PWM port according to the second state with the power-off state, upon the condition that the second state is different from the first state.

6. The storage medium as claimed in claim 5, wherein the PWM port further comprises a PWM register.

7. The storage medium as claimed in claim 6, wherein the method further comprising:
   writing a command of "0x0FFF0001" into the PWM register to disable the PWM port; and
   writing a command of "0x0FFF0701" into the PWM register to enable the PWM port.

8. The storage medium as claimed in claim 5, wherein the method further comprises:
   connecting an alternative current (AC) power supply to provide power to the host computer.

9. A host computer, comprising:
   a storage system;
   a pulse-width modulation (PWM) port;
   a powerGD port;
   at least one processor; and
   one or more programs stored in the storage system, executable by the at least one processor, the one or more programs comprising:
   a acquisition module that acquires signals of the powerGD port periodically;

a confirmation module that confirms a first state of the host computer corresponding to a first signal of the powerGD port;

a determination module that determines whether the first state is a power-on state or a power-off state;

a setting module that enables the PWM port, upon the condition that the first state is the power-on state, and disables the PWM port, upon the condition that the first state is the power-off state;

the confirmation module further confirms a second state of the host computer according to a second signal of the powerGD port;

the determination module further determines whether the second state is the same as the first state of the host computer;

the setting module further enables the PWM port according to the second state with the power-on state or disables the PWM port according to the second state with the power-off state, upon the condition that the second state is different from the first state.

10. The host computer as claimed in claim 9, wherein the PWM port further comprises a PWM register.

11. The host computer as claimed in claim 10, wherein the setting module writes a command of "0x0FFF0001" into the PWM register to disable the PWM port; and writes a command of "0x0FFF0701" into the PWM register to enable the PWM port.

12. The host computer as claimed in claim 9, wherein the host computer connects an alternative current (AC) power supply to provide power to the host computer.

* * * * *